United States Patent
Sherman

(10) Patent No.: US 9,189,617 B2
(45) Date of Patent: Nov. 17, 2015

(54) APPARATUS AND METHOD FOR IMPLEMENTING ZERO-KNOWLEDGE PROOF SECURITY TECHNIQUES ON A COMPUTING PLATFORM

(71) Applicant: Intel Corporation, Santa Clara, CA (US)

(72) Inventor: Brent M. Sherman, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 54 days.

(21) Appl. No.: 14/039,581

(22) Filed: Sep. 27, 2013

(65) Prior Publication Data

US 2015/0095655 A1 Apr. 2, 2015

(51) Int. Cl.
G06F 21/44 (2013.01)
G06F 21/31 (2013.01)
H04L 9/32 (2006.01)

(52) U.S. Cl.
CPC ............... *G06F 21/44* (2013.01); *G06F 21/31* (2013.01); *H04L 9/3218* (2013.01)

(58) Field of Classification Search
CPC ..... G06F 21/554; G06F 21/57; G06F 21/575; G06F 21/64; G06F 21/71; G06F 21/73; G06F 21/74; G06F 21/75; G06F 21/78
USPC ......... 726/2, 22; 713/168, 155, 162, 169, 170
See application file for complete search history.

(56) References Cited

U.S. PATENT DOCUMENTS

| | | | | |
|---|---|---|---|---|
| 4,926,479 | A * | 5/1990 | Goldwasser et al. | 713/180 |
| 4,969,189 | A * | 11/1990 | Ohta et al. | 713/180 |
| 2002/0067832 | A1* | 6/2002 | Jablon | 380/277 |
| 2004/0123156 | A1* | 6/2004 | Hammond et al. | 713/201 |
| 2005/0188218 | A1* | 8/2005 | Walmsley et al. | 713/200 |
| 2007/0121936 | A1* | 5/2007 | Guillou et al. | 380/30 |
| 2008/0130870 | A1* | 6/2008 | Boscher et al. | 380/28 |
| 2009/0019285 | A1* | 1/2009 | Chen et al. | 713/175 |

(Continued)

OTHER PUBLICATIONS

Unknown author, Cryptography CS 555 Lecture 20-b, Fall 2004Lecture 20, httpwww.slideserve.comannotcryptography-cs-555-lecture-20-b. Fall 2004. 17 pages.*

*Primary Examiner* — Chau Le
*Assistant Examiner* — Don Zhao
(74) *Attorney, Agent, or Firm* — Nicholson De Vos Webster & Elliott LLP

(57) ABSTRACT

An apparatus and method for zero knowledge proof security techniques within a computing platform. One embodiment includes a security module executed on a processing core to establish a domain of trust among a plurality of layers by sending a challenge from a verification layer to a first prover layer, the challenge comprising an indication of at least one selected option; in response to receiving the challenge, generating first verification information at the first prover layer based on the secret and the indication of the selected option; sending the first verification information to at least a second prover layer, the second prover layer generating second verification information based on the first verification information and the indication of the selected option; and performing a verification operation at the verification layer using the second verification information based on the selected option.

22 Claims, 11 Drawing Sheets

(56) References Cited

U.S. PATENT DOCUMENTS

| | | | |
|---|---|---|---|
| 2010/0115281 A1* | 5/2010 | Camenisch et al. | 713/175 |
| 2010/0325441 A1* | 12/2010 | Laurie et al. | 713/185 |
| 2011/0131631 A1* | 6/2011 | Ihori et al. | 726/3 |
| 2011/0202766 A1* | 8/2011 | Lerner | 713/168 |
| 2012/0005098 A1* | 1/2012 | Gross et al. | 705/50 |
| 2014/0032906 A1* | 1/2014 | Corella et al. | 713/168 |
| 2014/0090023 A1* | 3/2014 | Hu et al. | 726/4 |
| 2014/0137198 A1* | 5/2014 | Tsuria | 726/3 |

* cited by examiner

US 9,189,617 B2

APPARATUS AND METHOD FOR IMPLEMENTING ZERO-KNOWLEDGE PROOF SECURITY TECHNIQUES ON A COMPUTING PLATFORM

BACKGROUND

1. Field of the Invention

This invention relates generally to the field of computer processors. More particularly, the invention relates to an apparatus and method for implementing zero-knowledge proof security techniques on a computing platform, such as a mobile platform.

2. Description of the Related Art

Security on mobile platforms is currently based on a "chain of trust" which is a process in which a component assumes trust of its predecessor (i−1) and measures the integrity of its successor (i+1) before relinquishing control. This methodology works for booting which is a one-time operation. However, this solution falls short if a "chain of trust" needs to be maintained during runtime. One reason for this is that at runtime, components can change due to updates or third party add-ons. Since the loading process is unidirectional (i.e., the successor knows nothing about its predecessor), the "trust chain" can not be trusted.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments described below. It will be apparent, however, to one skilled in the art that the embodiments may be practiced without some of these specific details. In other instances, well-known structures and devices are shown in block diagram form to avoid obscuring the underlying principles of the embodiments.

Exemplary Processor Architectures and Data Types

Figure 1:
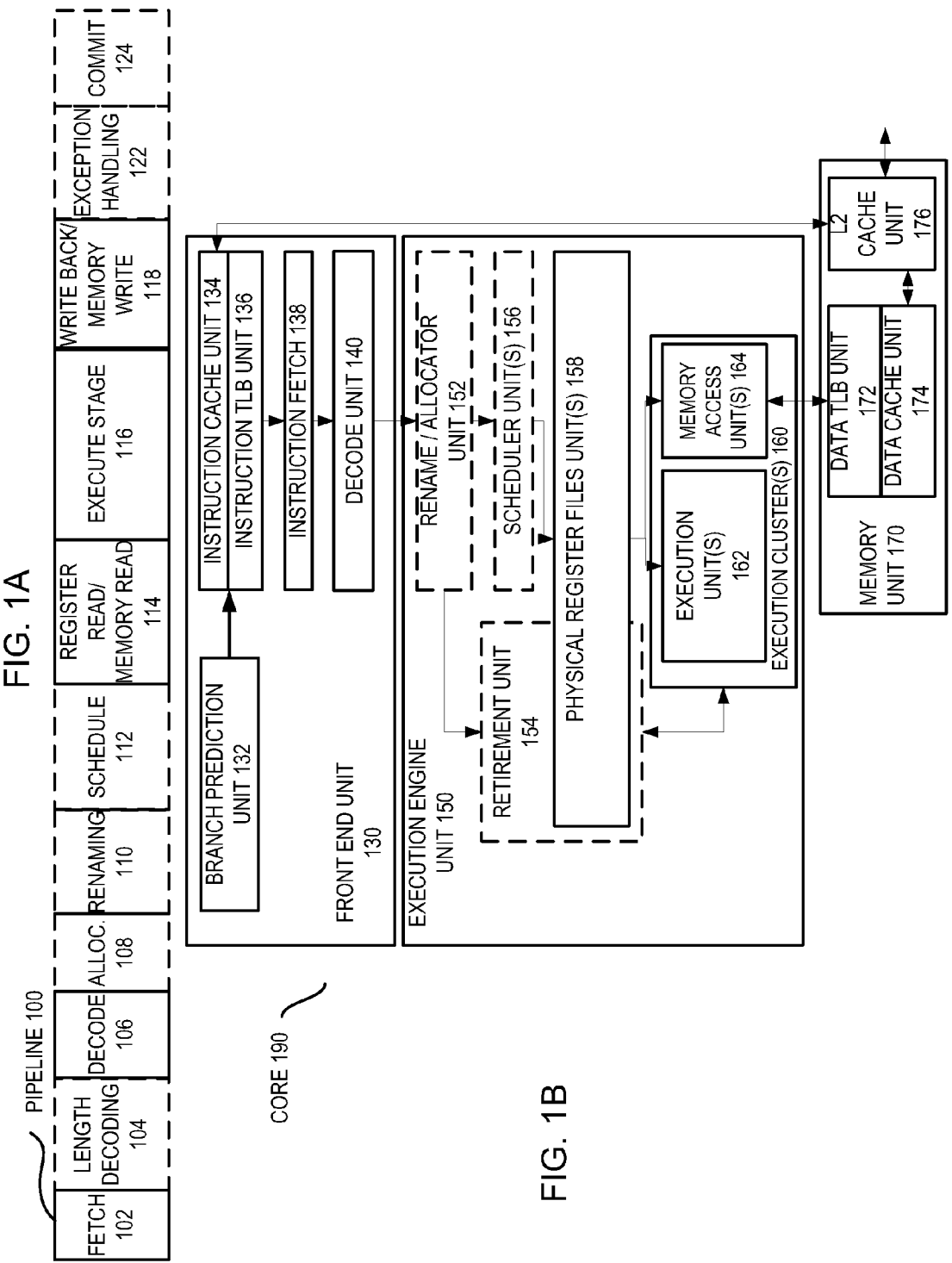
FIG. 1A is a block diagram illustrating both an exemplary in-order pipeline and an exemplary register renaming, out-of-order issue/execution pipeline according to embodiments.
FIG. 1B is a block diagram illustrating both an exemplary embodiment of an in-order architecture core and an exemplary register renaming, out-of-order issue/execution architecture core to be included in a processor according to embodiments.

FIG. 1A is a block diagram illustrating both an exemplary in-order pipeline and an exemplary register renaming, out-of-order issue/execution pipeline according to embodiments. FIG. 1B is a block diagram illustrating both an exemplary embodiment of an in-order architecture core and an exemplary register renaming, out-of-order issue/execution architecture core to be included in a processor according to embodiments. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM® instruction set (with optional additional extensions such as NEON™) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
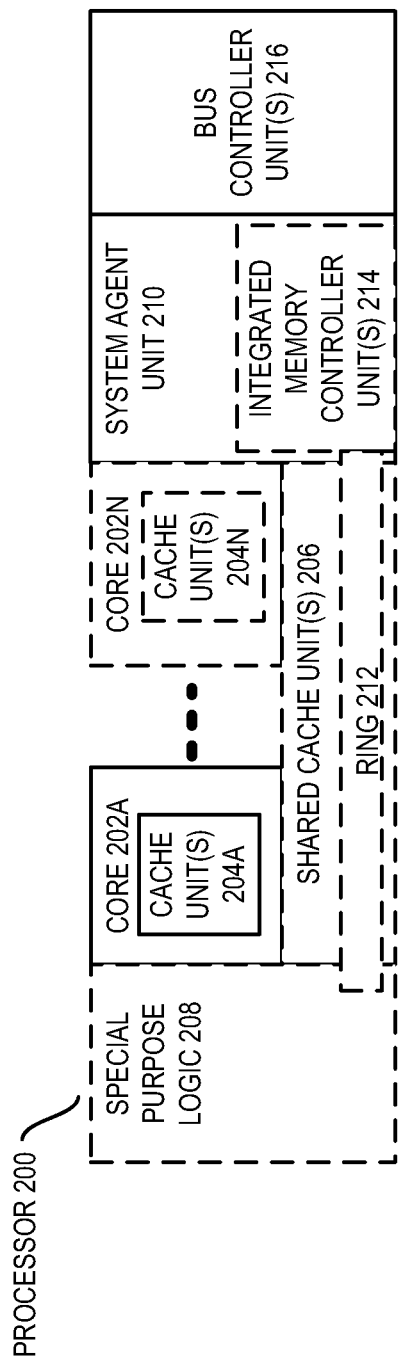
FIG. 2 is a block diagram of a single core processor and a multicore processor with integrated memory controller and graphics according to embodiments.

FIG. 2 is a block diagram of a processor 200 that may have more than one core, may have an integrated memory controller, and may have integrated graphics according to embodiments. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
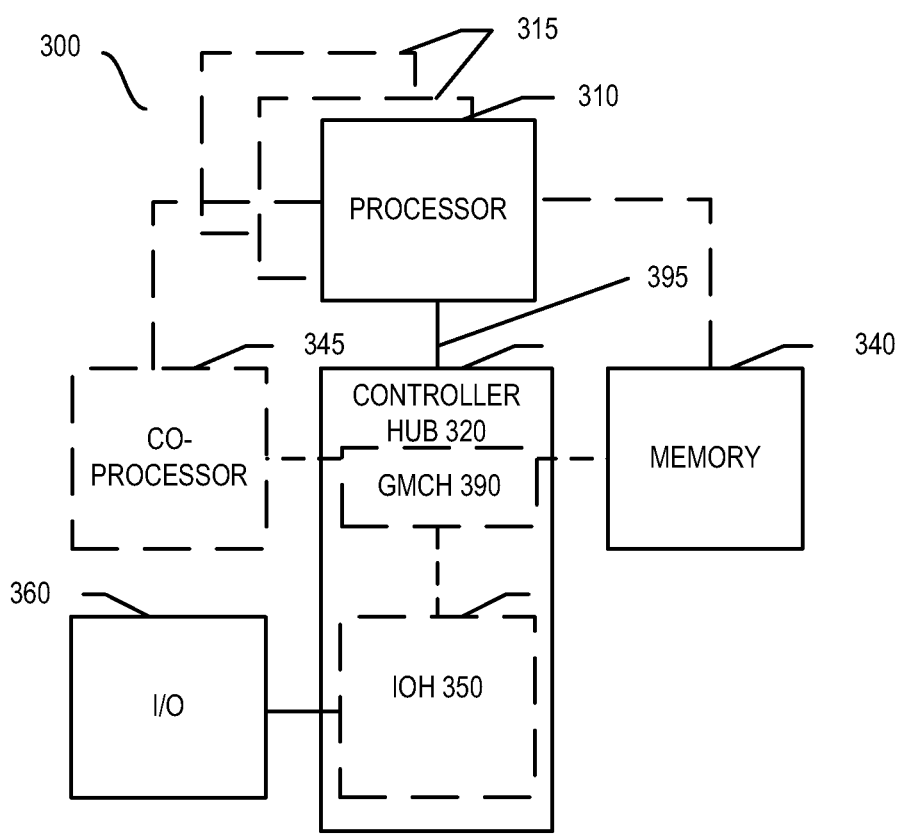
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
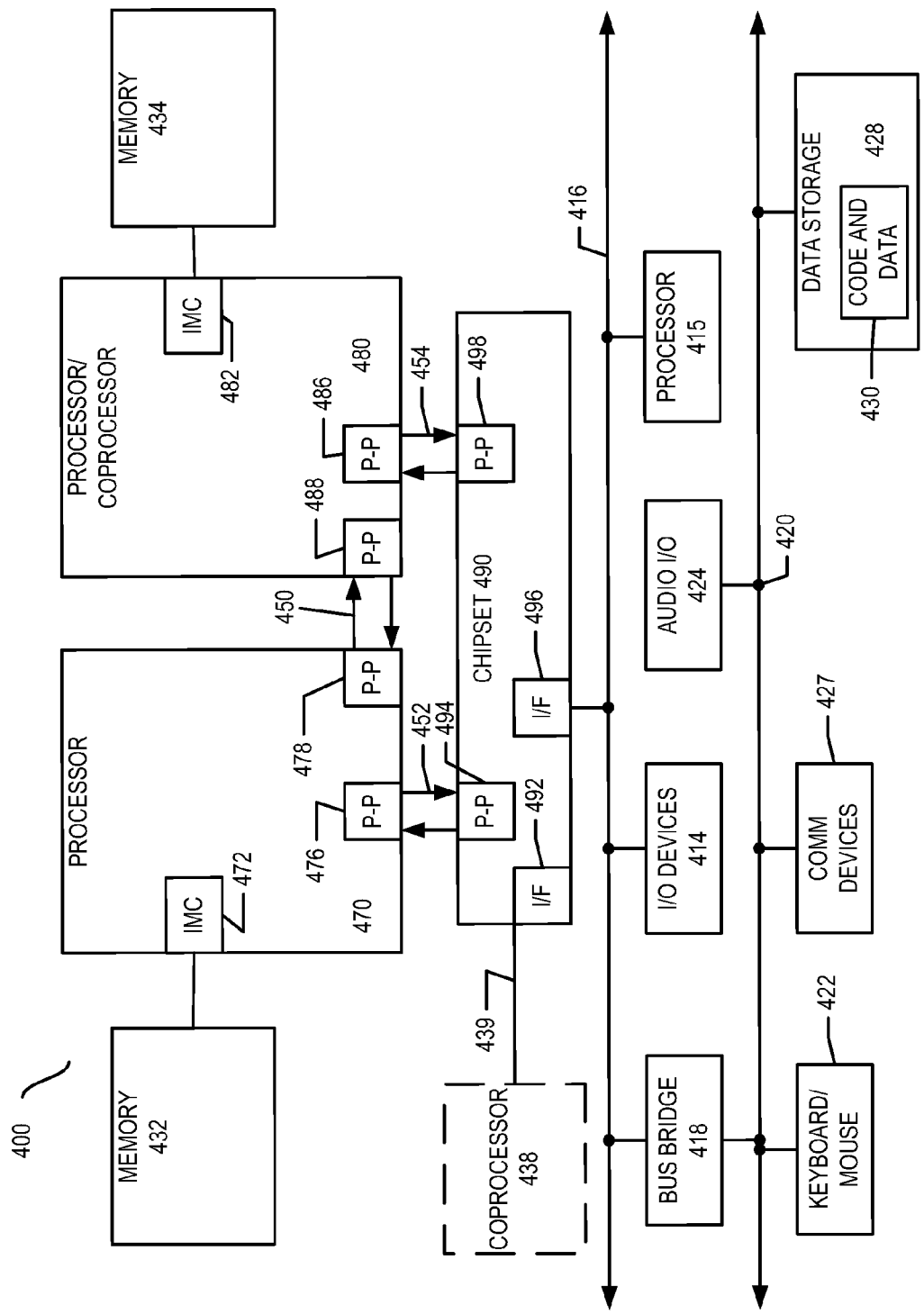
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
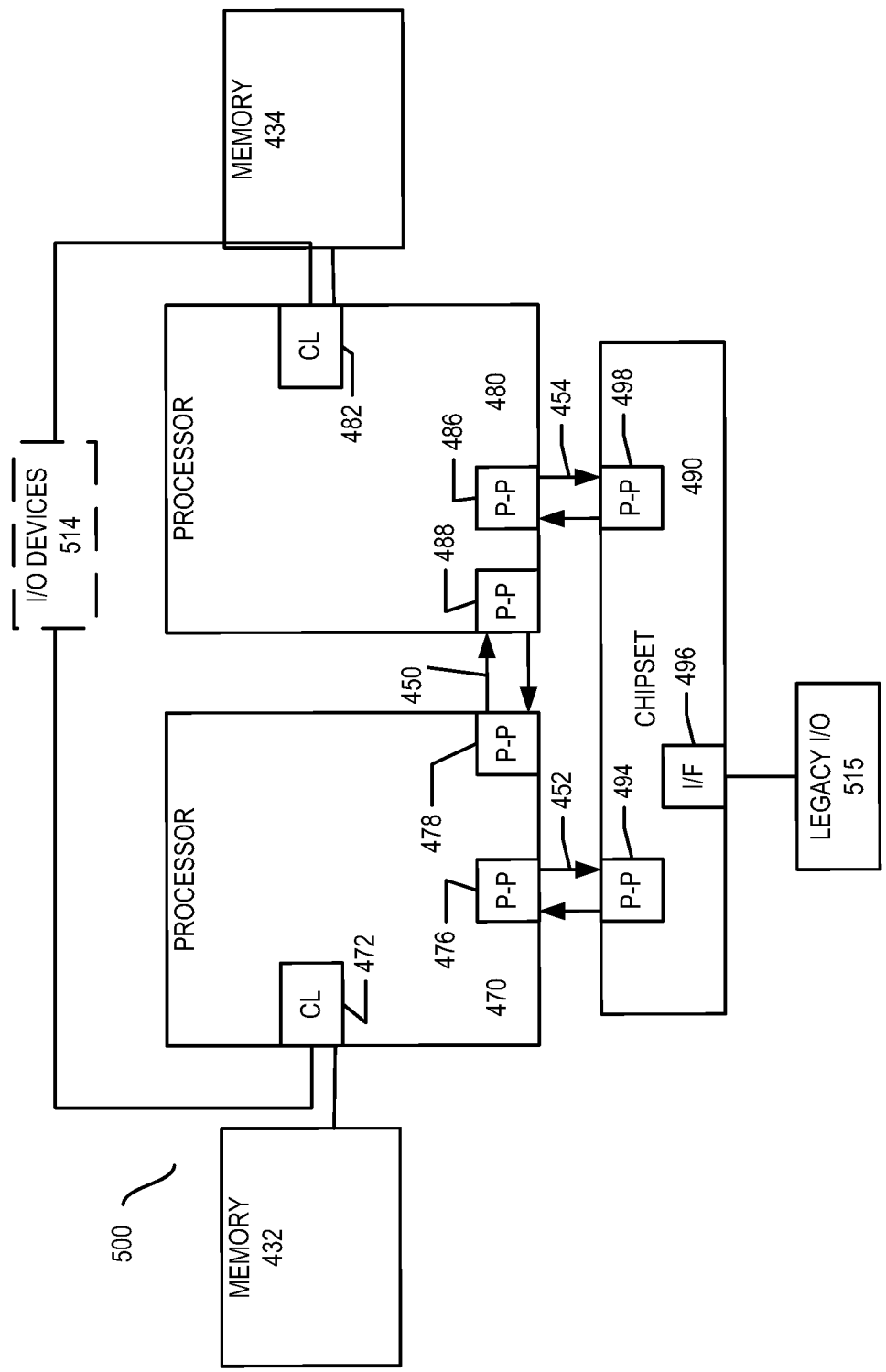
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
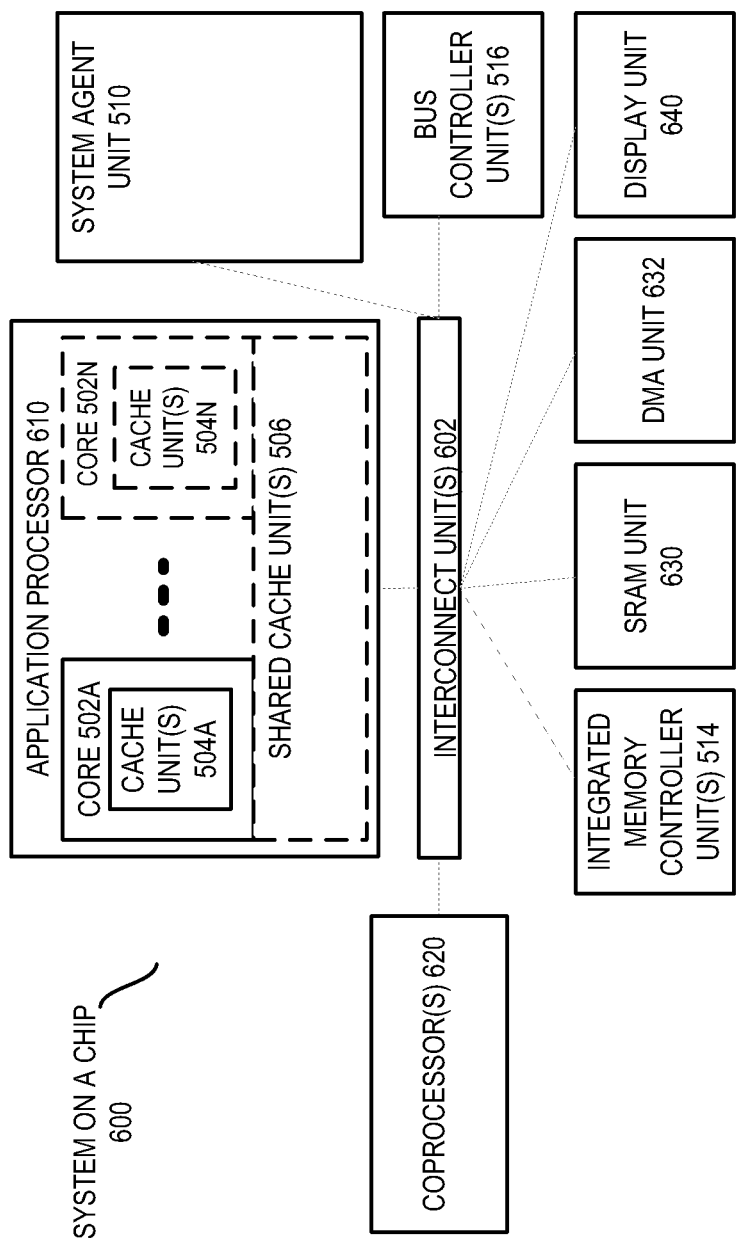
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
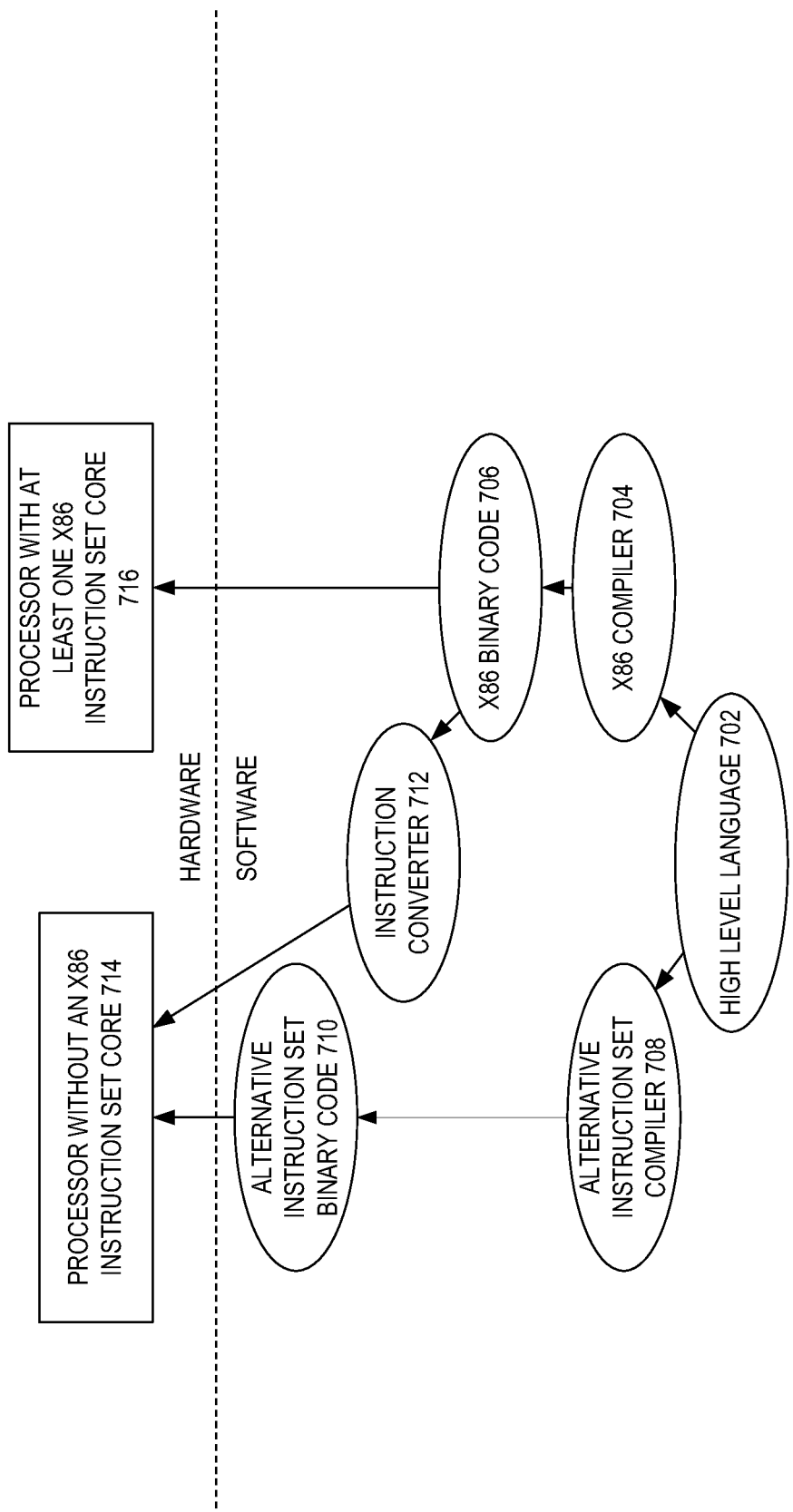
FIG. 7 illustrates a block diagram contrasting the use of a software instruction converter to convert binary instructions in a source instruction set to binary instructions in a target instruction set according to embodiments.

FIG. 7 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Figure 8:
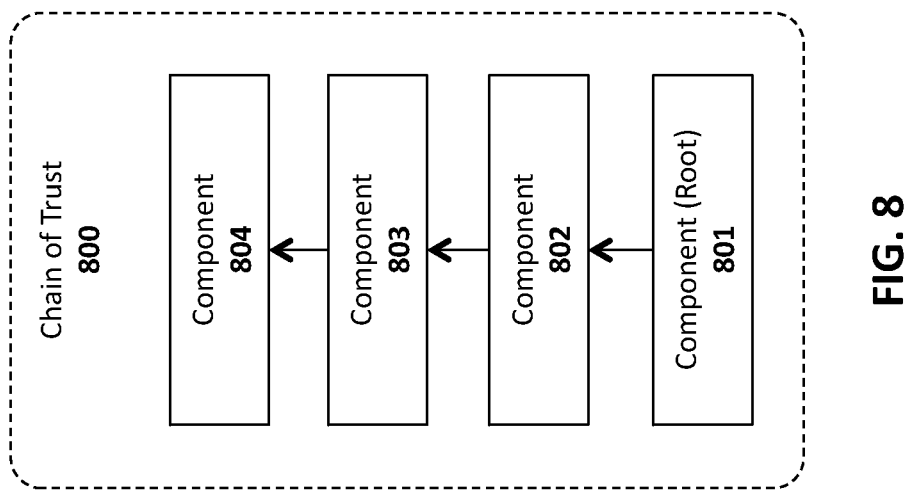
FIG. 8 illustrates a plurality of components within a chain of trust.

Apparatus and Method for Implementing
Zero-Knowledge Proof Security Techniques on a
Computing Platform FIG. 8 illustrates a traditional chain of trust 800 formed between a plurality of components 801-804 one of which comprises a root of trust 801. Under the chain of trust paradigm, a component assumes trust of its predecessor and measures the integrity of its successor before relinquishing control. Thus, in FIG. 8, the root of trust 801 verifies the integrity of component 802; component 802 verifies the integrity of component 803; and component 803 verifies the integrity of component 804. The root of trust 801 may be implemented, for example, with a trusted platform module (TPM) in combination with a basic input-output system (BIOS) on current computing systems.

The chain of trust 800 works acceptably well for components which are loaded into memory in a sequential manner such as during boot process. However, this solution falls short if a "chain of trust" needs to be maintained during runtime. One reason for this is that at runtime, components can change due to updates or third party add-ons. Since the loading process is unidirectional (i.e., the successor knows nothing about its predecessor), the "trust chain" can not be trusted.

One embodiment verifies the integrity of a component using techniques which do not require knowledge of a secret which is known by that component, referred to generally as a "zero knowledge proof." For example, assuming two components, A and B, where A does not know the secret but B does, the techniques described herein allow A verify that B knows the secret without actually learning the secret. A does this in one embodiment by sending challenges to B and monitoring B's responses. If a specified number of B's responses indicate that B knows the secret (e.g., based on a specified percentage of correct responses or some other specified threshold), then A validates the integrity of B.

In addition, rather than simply being implemented in a peer-to-peer manner with two components (e.g., A and B), one embodiment of operates across multiple layers of components such as the multiple layers of software components executed within a mobile platform during runtime. In this way, the underlying principles may be used to continue to verify the integrity of components during runtime.

In one embodiment, a variation of the Fiat-Shamir Identification Protocol is used to determine whether a component can be trusted. While the current Fiat-Shamir Identification Protocol operates in a peer-to-peer manner with two components (i.e., a "prover" and a "verifier"), one embodiment extends the Fiat-Shamir Identification Protocol to operate across multiple software components.

The Fiat-Shamir Identification Protocol will first be described with respect to Table A below. In step 1, the prover generates large primes, p and q, multiplies these values together, and then uses the result, n, to generate a secret s mod n at step 2. The "mod" or "modulus" operation is well understood by those of skill in the art. For a positive integer n, two integers a and b are said to be congruent modulo n, written: a=b mod n if their difference a−b is an integer multiple of n. Said another way, n divides a−b. The number n is called the modulus of the congruence. At step 3 the prover squares the secret and at step 4, sends out the result, v, with n. The verifier then stores n and v.

In the above example, the secret s is within parameters of mod n and n is generated based on two large primes p and q. It should be noted that s could be generated in a variety of alternate ways while still complying with the underlying principles (as long as it is within mod n). Thus, in steps 1-4 above, the secret is never sent; only the square is known and it is very difficult to go backwards exponentially to determine the secret as long as the primes selected are large.

At step 5, the verifier generates a challenge which, in one embodiment, comprises a request for a nonce (e.g., an arbitrary value used once within a single transaction). In response, the prover generates a nonce using r mod n and at step 6, sends $r^2$ mod n.

TABLE A

| | Initialization | |
|---|---|---|
| Step# | Verifier | Prover |
| 1 | | Generate mod n = pq, p &q are large primes |
| 2 | | Generate a secret s mod n |
| 3 | | Generate v = $s^2$ mod n |
| 4 | Stores (n, v) ← Verification | Send (n, v) |
| 5 | Request nonce | Generate nonce r mod n |
| 6 | ← | Send x = $r^2$ mod n |
| 7 | Randomly choose e {0, 1} → | If (e == 0), y = r |
| | | If (e == 1), y = (rs)mod n |
| 8 | If (e == 0), verify $y^2$ = x mod n ← If (e == 1), verify $y^2$ = (xv) mod n | Send y |
| 9 | Repeat steps [5, 8] t times until confidence is established | |

At step 7, the verifier randomly chooses a value for a binary variable e such that e=1 or 0. If e=0, then the prover sets the value to be returned, y, equal to r. If e=1, then y is set equal to the multiplication of (rs) mod n. The value of y is then returned to the verifier at step 8. Once received, the verifier verifies the response using the equations $y^2$=x mod n, if e=0 or $y^2$=(xv) mod n if e=1. The above steps (starting with the request for a nonce) may be repeated some number of times at step 9 until the verifier has sufficient confidence in the identity of the prover.

The above protocol is limited to only a peer-to-peer communication. In order to be used in a distributed fashion for a chain of components, one embodiment employs the following improvements. Note that the primary changes in one embodiment are made to the challenge and response portions of the protocol.

Figure 9:
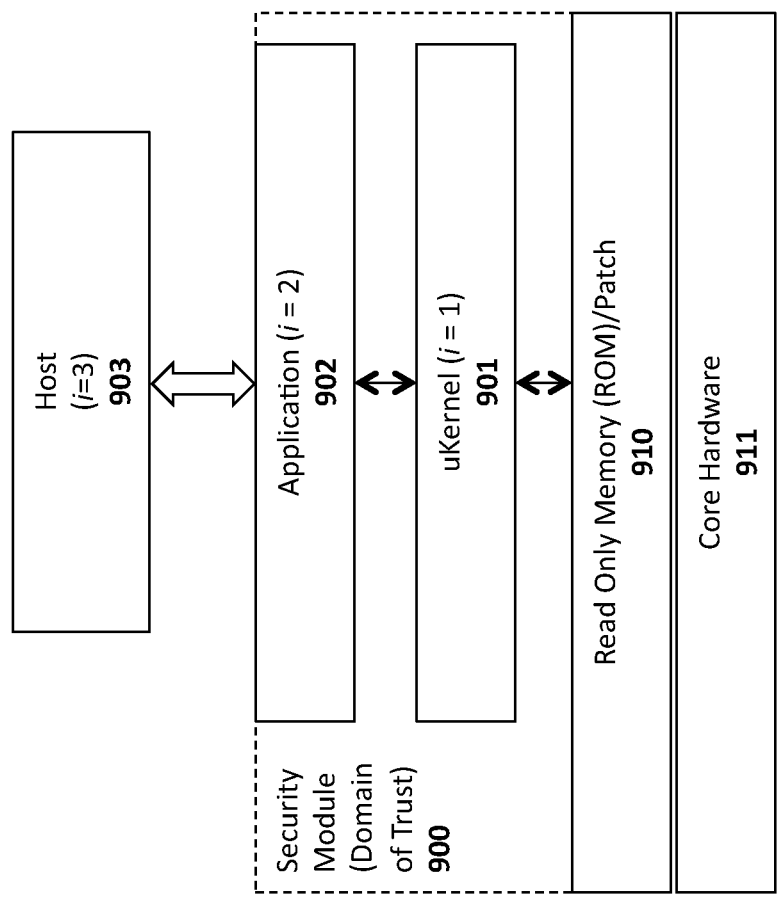
FIG. 9 illustrates a domain of trust implemented using one embodiment.
Figure 10:
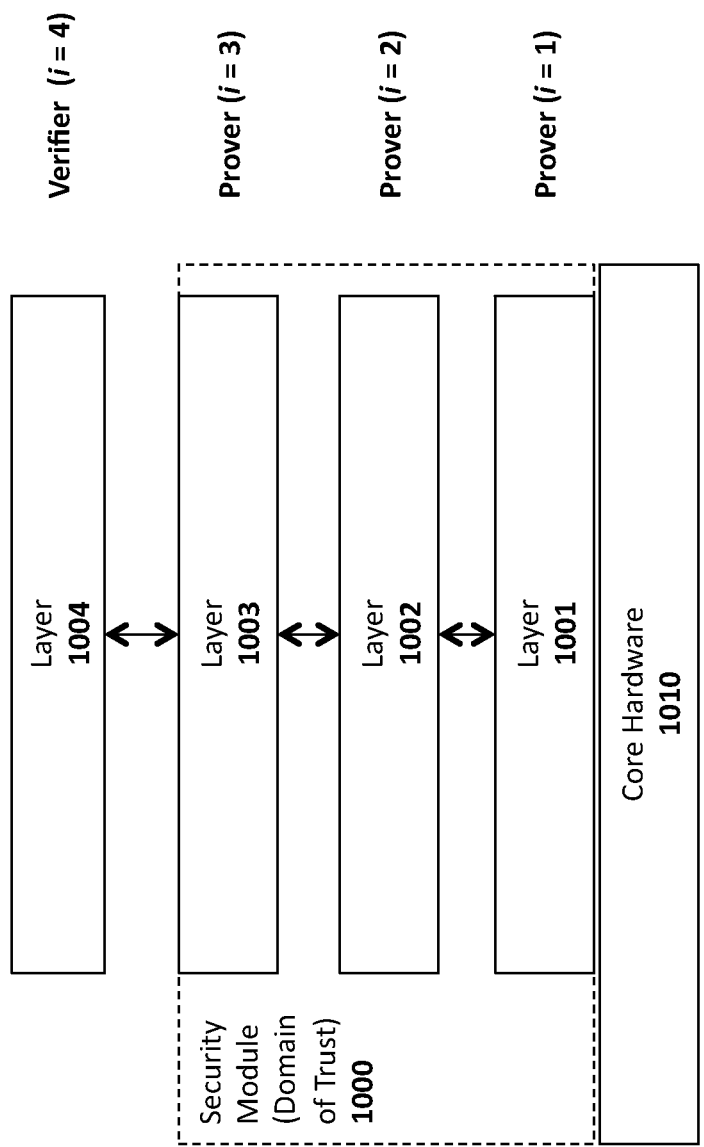
FIG. 10 illustrates a domain of trust implemented using another embodiment.

In one embodiment, to operate within the context of a chain of components (rather than simply in a 1-to-1 relationship between peers) the above operations are performed multiple times using the challenge $X_i=(r_i X_{i-1})^2$ where $X_0=1$ for $i \geq 1$ as shown in Table B below. In one embodiment, the components executed within a computing platform are logically arranged in layers as illustrated in FIGS. 9-10 and the variable i indicates each layer within the group of components. In one embodiment, the computing platform comprises a mobile platform, but the underlying principles are not limited to any particular type of computing platform.

TABLE B

| Challenge |
|---|
| $X_i = (r_i X_{i-1})^2$, where $X_0 = 1$, $i \geq 1$ |

| | Response |
|---|---|
| e == 0 | $Y_i = r_i(Y_{i-1})^2$, where $Y_0 = 1$, $i \geq 1$ |
| e == 1 | $Y_1 = r_1^2 s$ |
| e == 1 | $Y_i = r_i(Y_{i-1})^j v^{-k}$, where:<br>1. $i \geq 2$<br>2. if (i == 2) then (j = 1) else (j = 2)<br>3. If (i $\geq$ 3) then (k = ½) else (k = 0) |

| | Verification |
|---|---|
| e == 0 | $y^2 = x \mod n$ |
| e == 1 | $y^2 = (xv) \mod n$ |

As discussed above, the verifier chooses randomly between e=0 and e=1. If e=0, then in one embodiment, the response generated by the prover is $Y_i=r_i(Y_{i-1})^2$ where $Y_0=1$ for $i \geq 1$. If e=1, then in one embodiment, the response generated by the prover is $Y_1=r_1^2 s$ for i=1, or $Y_i=r_i(X_{i-1})^j v^{-k}$ where:

1. $i \geq 2$
2. if (i == 2) then (j = 1), else (j = 2)
3. if (i $\geq$ 3) then (k = ½), else k = 0

The verifier then verifies the results as previously discussed. For example, the verifier verifies $y^2=x \mod n$, if e=0 or $y^2=(xv) \mod n$ if e=1.

A proof of the foregoing techniques where i=6 (six software layers) is set forth below in Table C.

TABLE C

| Proof by Example (i == 6 layers in the chain) | |
|---|---|
| (e == 0): $y_6^2 = x_6 \mod n$ | (e == 1): $y_6^2 = (x_6 v) \mod n$ |
| $(r_6 y_5^2)^2 = (r_6 x_5)^2$ | $r_6 y_5^2 v^{-1/2})^2 = (r_6 x_5)^2 v$ |
| $r_6^2 y_5^4 = r_6^2 x_5^2$ | $r_6^2 y_5^4 v^{-1} = r_6^2 x_5^2 v$ |
| $r_6^2 (r_5 y_4^2)^4 = r_6^2 (r_5^2 x_4^2)^2$ | $r_6^2 (r_5 y_4^2 v^{-1/2})^4 v^{-1} = r_6^2 (r_5^2 x_4^2)^2 v$ |
| $r_6^2 r_5^4 y_4^8 = r_6^2 r_5^4 x_4^4$ | $r_6^2 r_5^4 y_4^8 v^{-3} = r_6^2 r_5^4 x_4^4 v$ |
| $r_6^2 r_5^4 (r_4 y_3^2)^8 = r_6^2 r_5^4 (r_4^2 x_3^2)^4$ | $r_6^2 r_5^4 (r_4 y_3^2 v^{-1/2})^8 v^{-3} = r_6^2 r_5^4 (r_4^2 x_3^2)^4 v$ |
| $r_6^2 r_5^4 r_4^8 y_3^{16} = r_6^2 r_5^4 r_4^8 x_3^8$ | $r_6^2 r_5^4 r_4^8 y_3^{16} v^{-7} = r_6^2 r_5^4 r_4^8 x_3^8 v$ |
| $r_6^2 r_5^4 r_4^8 (r_3 y_2^2)^{16} =$ | $r_6^2 r_5^4 r_4^8 (r_3 y_2^2 v^{-1/2})^{16} v^{-7} =$ |
| $r_6^2 r_5^4 r_4^8 (r_3^2 x_2^2)^8$ | $r_6^2 r_5^4 r_4^8 (r_3^2 x_2^2)^8 v$ |
| $r_6^2 r_5^4 r_4^8 r_3^{16} y_2^{32} = r_6^2 r_5^4 r_4^8 r_3^{16} x_2^{16}$ | $r_6^2 r_5^4 r_4^8 r_3^{16} y_2^{32} v^{-15} =$ |
| | $r_6^2 r_5^4 r_4^8 r_3^{16} x_2^{16} v$ |

TABLE C-continued

| Proof by Example (i == 6 layers in the chain) | |
|---|---|
| (e == 0): $y_6^2 = x_6 \mod n$ | (e == 1): $y_6^2 = (x_6 v) \mod n$ |
| $r_6^2 r_5^4 r_4^8 r_3^{16} (r_2 y_1^2)^{32} =$ | $r_6^2 r_5^4 r_4^8 r_3^{16} (r_2 y_1)^{32} v^{-15} =$ |
| $r_6^2 r_5^4 r_4^8 r_3^{16} (r_2^2 x_1)^{16}$ | $r_6^2 r_5^4 r_4^8 r_3^{16} (r_2^2 x_1)^{16} v$ |
| $r_6^2 r_5^4 r_4^8 r_3^{16} r_2^{32} y_1^{64} =$ | $r_6^2 r_5^4 r_4^8 r_3^{16} r_2^{32} y_1^{32} v^{-15} =$ |
| $r_6^2 r_5^4 r_4^8 r_3^{16} r_2^{32} x_1^{32}$ | $r_6^2 r_5^4 r_4^8 r_3^{16} r_2^{32} x_1^{32} v$ |
| $r_6^2 r_5^4 r_4^8 r_3^{16} r_2^{32} (r_1 y_0^2)^{64} =$ | $r_6^2 r_5^4 r_4^8 r_3^{16} r_2^{32} (r_1^2 S)^{32} v^{-15} =$ |
| $r_6^2 r_5^4 r_4^8 r_3^{16} r_2^{32} (r_1^2 x_0^2)^{32}$ | $r_6^2 r_5^4 r_4^8 r_3^{16} r_2^{32} (r_1^2)^{32} v$ |
| $r_6^2 r_5^4 r_4^8 r_3^{16} r_2^{32} r_1^{64} (1)^{128} =$ | $r_6^2 r_5^4 r_4^8 r_3^{16} r_2^{32} r_1^{64} s^{32} v^{-15} =$ |
| $r_6^2 r_5^4 r_4^8 r_3^{16} r_2^{32} r_1^{64} (1)^{64}$ | $r_6^2 r_5^4 r_4^8 r_3^{16} r_2^{32} r_1^{64} v$ |
| $r_6^2 r_5^4 r_4^8 r_3^{16} r_2^{32} r_1^{64} =$ | $r_6^2 r_5^4 r_4^8 r_3^{16} r_2^{32} r_1^{64} s^{32} (s^2)^{-15} =$ |
| $r_6^2 r_5^4 r_4^8 r_3^{16} r_2^{32} r_1^{64}$ | $r_6^2 r_5^4 r_4^8 r_3^{16} r_2^{32} r_1^{64} v$ |
| | $r_6^2 r_5^4 r_4^8 r_3^{16} r_2^{32} r_1^{64} s^{32} s^{-30} =$ |
| | $r_6^2 r_5^4 r_4^8 r_3^{16} r_2^{32} r_1^{64} v$ |
| | $r_6^2 r_5^4 r_4^8 r_3^{16} r_2^{32} r_1^{64} s^2 =$ |
| | $r_6^2 r_5^4 r_4^8 r_3^{16} r_2^{32} r_1^{64} v$ |

FIG. 9 illustrates an exemplary security module 900 which implements a domain of trust utilizing the above techniques. In this example, the host 903 (at layer i=3) acts as a verifier and the two provers are the application 902 (at later i=2) and the micro-kernel (uKernel) 901 (at layer i=1). Since the host 903 is the consumer in this embodiment, it needs to verify that the application 902 and the uKernel 901 have not been modified in any way. Thus, it uses the techniques described herein to verify that the chain of trust is healthy. For example, if the application or uKernel drivers that interface with the core hardware 911 have been modified, the verification would fail using the techniques described herein.

The operations employed by one embodiment of the architecture of FIG. 9 are shown in Table D below. In operation 1, the uKernel (at i=1 in this specific example), generates mod n=pq. In operation 2 It then generates a secret s=Hash[uKernel] mod n and, in operation 3, $v=s^2 \mod n$. The "Hash [uKernel]" represents a hash function performed on some characteristic of the uKernel layer. For example, a Secure Hash Algorithm (SHA) such as an SHA-1 or SHA-2 may be performed on the binary image of the uKernel itself.

Regardless of the particular hash operation performed, in operation 4, the uKernel sends v and n up to the application layer (layer i=2 in the example) which stores and forwards n and v to the host layer (layer i=3; the verifier in the example). The host layer stores the values of n and v for the verification process.

The verification process starts at operation 5 where the verifier sends a request for a nonce to the application layer which, at operation 6, sends a request for a nonce to the uKernel layer 901. In response, the uKernel generates $r_1$ mod n and, in operation 7, $x_1=r_1^2 \mod n$ and sends $x_1$ to the application layer. The application layer generates a nonce $r_1$ mod n and $x_2=(r_2 x_1)^{2 \mod n}$ and sends $x_2$ to the host in operation 8. Thus, the uKernel generates a challenge ($x_1$) which the Application uses to generate a challenge ($x_2$).

TABLE D

| | Initialization (Load-time) | | |
|---|---|---|---|
| Op# | Host (Verifier) | Application (Prover) | uKernel (Prover) |
| 1 | | | Generate mod n = pq |
| 2 | | | Generate secret: s = Hash[uKernel] mod n |
| 3 | | | Generate v = $s^2$ mod n |
| 4 | Stores n, v | ← Sends and stores (n, v) | ← Sends (n, v) |

TABLE D-continued

| | Initialization (Load-time) | | |
|---|---|---|---|
| Op# | Host (Verifier) | Application (Prover) | uKernel (Prover) |
| | Verification (Run-time) | | |
| 5 | Requests nonce → | | |
| 6 | | Requests nonce → | Generates $r_i$ mod n |
| 7 | | Generates nonce $r_2$ mod n | Send $x^1 = r_1^2$ mod n |
| 8 | | Sends $X_2 = (r_2 x_1)^2$ mod n ← | |
| 9 | Randomly choose → e {0, 1} | Sends e → | If (e == 0), $y_1 = r_1$ mod n<br>If (e == 1), $y_1 = (x_1 s)$ mod n |
| 10 | | If (e == 0), $y_2 = (r_2 y_1^2)$ mod n<br>If (e == 1, y2 = r2 y1 mod n | ← Sends $y_1$ |
| 11 | | ← Sends $y_2$ | |
| 12 | If (e == 0) verify:<br>$y_2^2 = x_2$ mod n<br>If (e == 1) verify:<br>$y_2^2 = (x_2 v)$ mod n | | |
| 13 | Repeat steps [5, 12] t times until confidence is established | | |

In operation 9, the host randomly chooses e=1 or 0 (as previously described) and sends e to the uKernel layer 901 via the application layer 902. In response, if e=0, the uKernel layer generates $y_1 = r_1$ mod n and if e=1, the uKernel layer generates $y_1 = (x_1 s)$ mod n. In operation 10, the uKernel layer sends $y_1$ to the application layer which then uses $y_1$ to generate its result. In particular, in the specific example shown in Table D, the application generates $y_2 = (r_2 y_1^2)$ mod n if e=0 or $y_2 = (r_2 y_1)$ mod n if e=1. In operation 11, the application layer sends $y_2$ to the host and, in operation 12, the host verifies the $y_2$ result. In particular, If e==0, then it verifies $y_2^2 = x_2$ mod n and if e=1, then if verifies $y_2^2 = (x_2 v)$ mod n. The above operations are performed t times (operation 13) until confidence of the integrity of the application and uKernel is established. A proof of the above techniques is provided in Table E below.

TABLE E

| Proof (e == 0): $y_2^2 = x_2$ mod n | Proof (e == 1): $y_2^2 = x_2 v$ mod n |
|---|---|
| $(r_2 y_1^2)^2 = (x_1 r_2)^2$ | $(r_2 y_1^2)^2 = (x_1 r_2)^2 v$ |
| $r_2^2 y_1^4 = x_1^2 r_2^2$ | $r_2^2 y_1^2 = x_1^2 r_2^2 s^2$ |
| $r_2^2 (r_1)^4 = (r_1^2)^2 r_2^2$ | $r_2^2 (x_1 s)^2 = x_1^2 r_2^2 s^2$ |
| $r_2^2 r_1^4 = r_1^4 r_2^2$ | $r_2^2 x_1^2 s^2 = x_1^2 r_2^2 s^2$ |

The underlying principles are not limited to the specific architecture shown in FIG. 9. For example, the embodiments may be implemented within the context of any computing architecture which includes any number of layers where a verifier needs to verify the integrity of one or more provers without learning a secret known by the provers. FIG. 10, for example, shows an implementation in which a security module 1000 establishes a domain of trust and implements the underlying principles across four different layers 1001-1004 executed on core hardware 1010. In this example, layer 1004 (layer i=4) is the verifier and layers 1001-1003 (layers i=1-3, respectively) are the provers. Communication from the verifier (i=4) to the lowest layer (i=1) may pass through the intermediate layers (i=2, 3) as discussed above. In addition, during verification, verification data generated by a lower layer is used by the next layer in succession to generate the next layer's verification data (until the final verification data is received by the top layer which performs the verification).

Figure 11:
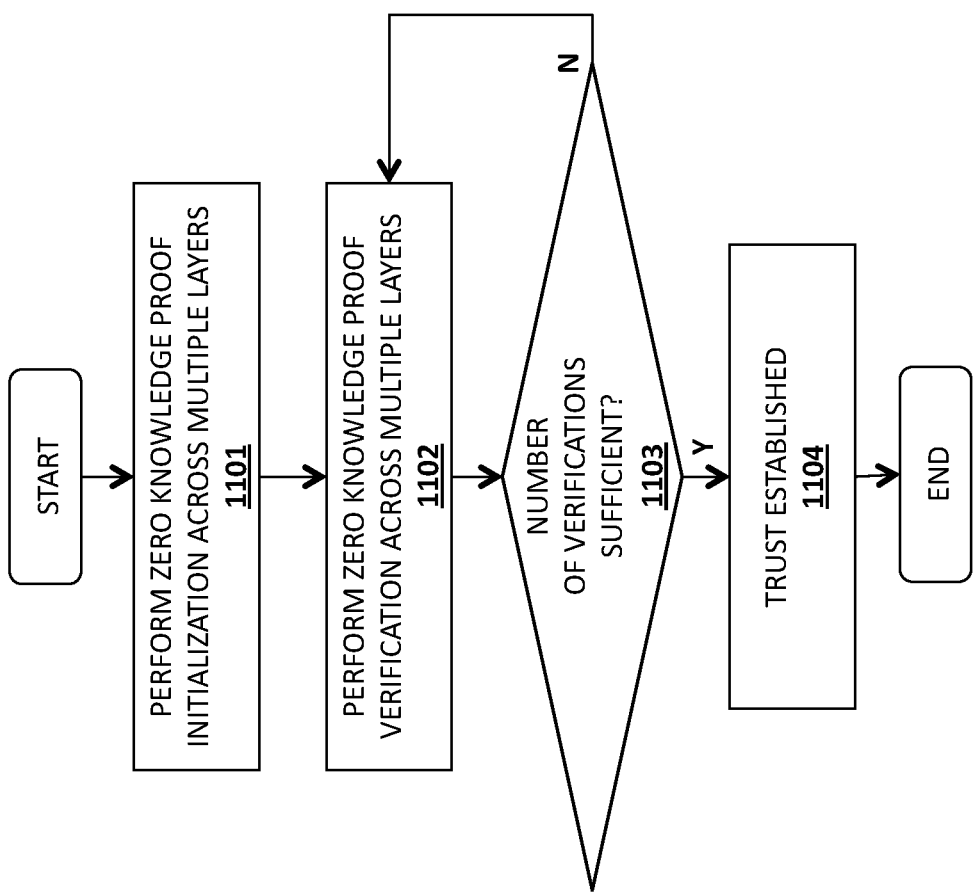
FIG. 11 illustrates a method in accordance with one embodiment.

FIG. 11 illustrates a method in accordance with one embodiment. The method may be implemented within the context of the architectures described above (see, e.g., FIGS. 9-10) but it not limited to any particular architecture.

At 1101, a zero knowledge proof is performed to initialize multiple layers within multi-layer chain of components. For example, in one embodiment the lowest layer of the multi-layer architecture generates a secret and sends information related to the secret to layers further up the architecture. Each of the layers then stores the information (see, e.g., steps 1-4 in Table D).

At 1102, a zero knowledge proof verification is performed across multiple layers. That is, an upper layer verifies the integrity of one or more lower layers without learning the secret held by the lower layers. In one embodiment, this is accomplished by sending a challenge, receiving a response, and then selecting one of two options for a verification. The one or more of the layers may then generate a verification result using the secret, but without revealing the secret, and sending the verification result to the upper layer. The upper layer may then use the verification result to verify the integrity of the lower layers.

At 1103 a determination is made as to whether the number of verifications is sufficient. As previously discussed, the upper layer (or "verifier") may perform verification a specified number of times to ensure the integrity of the lower layers. If the number of verifications is not yet sufficient, then the process returns to 1102 and another verification is conducted. If so, then trust is established at 1104 and the process is complete.

the "layers" described herein may be various different components within a computing system. For example, the layers (such as the Host layer discussed above) may comprise a secure monitor/hypervisor, a guest application, a guest operating system, secure logic executing firmware, and/or a binary translation layer, to name a few.

Embodiments may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that embodiment may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
   at least one processing core to execute instructions and process data; and
   a security module to be executed on the processing core to establish a domain of trust among a plurality of layers, wherein establishing the domain of trust comprises:
   generating a secret at a first prover layer, wherein the secret is a single value;
   providing information derived from the secret, but not the secret, from the first prover layer to a verification layer of the plurality of layers;
   sending a challenge from the verification layer to the first prover layer after the verification layer receives the information derived from the secret, the challenge comprising an indication of at least one selected option;
   in response to receiving the challenge, generating first verification information at the first prover layer based on the secret and the indication of the selected option;
   sending the first verification information to a second prover layer, the second prover layer generating second verification information based on the first verification information and the indication of the selected option; and
   performing a verification operation at the verification layer using the information derived from the secret and the second verification information based on the selected option.

2. The apparatus as in claim 1 wherein the challenge is transmitted through second prover layer to the first prover layer.

3. The apparatus as in claim 1 wherein the verification layer comprises a host and the first prover layer comprises a uKernel layer.

4. The apparatus as in claim 1 wherein the secret is generated based on a hash value generated based on a characteristic of the first prover layer.

5. The apparatus as in claim 4 wherein the secret comprises the hash value mod n where n comprises a product of two prime numbers selected by the first prover layer.

6. The apparatus as in claim 5 wherein the first prover layer squares the secret and sends the square of the secret mod n to the second prover layer and the verification layer.

7. The apparatus as in claim 6 wherein the first prover layer additionally sends the product of the two prime numbers to the second prover layer and the verification layer.

8. The apparatus as in claim 1 wherein the verification layer performs an additional operation of requesting a nonce from the first prover layer,
   the first prover layer responsively generating a first nonce and sending a first value derived from the first nonce to the second prover layer,
   the second prover layer generating a second nonce and generating a second value derived from the first value and the second nonce, the second prover layer sending the second value to the verification layer.

9. The apparatus as in claim 8 wherein the first nonce comprises $r_1$ mod n, the first value comprises $x^1=r_1^2$ mod n, the second nonce comprises $r_2$ mod n, and the second value comprises $(r_2 x_1)^2$ mod n.

10. The apparatus as in claim 1 wherein the selected option comprises a selected binary value of 1 or 0.

11. The apparatus as in claim 10 wherein if the selected binary value =0, then the first prover layer generates $y_1=r_1$ mod n for the first verification information and if the selected binary value =1, then the first prover layer generates $y_1=(x_1 s)$ mod n for the first verification information.

12. The apparatus as in claim 11 wherein if the selected binary value =0, then the second prover layer generates $y_2=(r_2 y_1)$ mod n for the second verification information and wherein if the selected binary value =1, then the second prover layer generates $y_2=(r_2 y_1)$ mod n for the second verification information.

13. The apparatus as in claim 12 wherein performing the verification operation by the verification layer comprises verifying that $y_2^2=x_2$ mod n if the selected binary value =0 and verifying $y_2^2=(x_2 v)$ mod n if the selected binary value =1.

14. The apparatus as in claim 1 wherein the challenge is sent from the verification layer to the first prover layer via the second prover layer.

15. A method comprising:
   executing instructions and processing data on at least one processor core;
   executing a security module on the processing core to establish a domain of trust among a plurality of layers, wherein establishing the domain of trust comprises:
   generating a secret at a first prover layer, wherein the secret is a single value;
   providing information derived from the secret, but not the secret, from the first prover layer to a verification layer of the plurality of layers;
   sending a challenge from the verification layer to the first prover layer after the verification layer receives the information derived from the secret, the challenge comprising an indication of at least one selected option;
   in response to receiving the challenge, generating first verification information at the first prover layer based on the secret and the indication of the selected option;
   sending the first verification information to a second prover layer, the second prover layer generating second verification information based on the first verification information and the indication of the selected option; and
   performing a verification operation at the verification layer using the information derived from the secret and the second verification information based on the selected option.

16. The method as in claim 15 wherein the challenge is transmitted through second prover layer to the first prover layer.

17. The method as in claim 15 wherein the verification layer comprises a host and the first prover layer comprises a uKernel layer.

18. The method as in claim 15 wherein the secret is generated based on a hash value generated based on a characteristic of the first prover layer.

19. The method as in claim 18 wherein the secret comprises the hash value mod n where n comprises a product of two prime numbers selected by the first prover layer.

20. The method as in claim 19 wherein the first prover layer squares the secret and sends the square of the secret mod n to the second prover layer and the verification layer.

21. The method as in claim 20 wherein the first prover layer additionally sends the product of the two prime numbers to the second prover layer and the verification layer.

22. The method as in claim 15 wherein the challenge is sent from the verification layer to the first prover layer via the second prover layer.

* * * * *